United States Patent
Fullerton et al.

(10) Patent No.: US 6,834,026 B2
(45) Date of Patent: Dec. 21, 2004

(54) METHOD FOR THERMALLY-ASSISTED RECORDING ON A MAGNETIC RECORDING DISK

(75) Inventors: Eric E. Fullerton, Morgan Hill, CA (US); Stefan Maat, San Jose, CA (US); Jan-Ulrich Thiele, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/626,362

(22) Filed: Jul. 23, 2003

(65) Prior Publication Data

US 2004/0071923 A1 Apr. 15, 2004

Related U.S. Application Data

(63) Continuation of application No. 10/015,513, filed on Dec. 11, 2001, now abandoned.

(51) Int. Cl.$^7$ ............................................. G11B 11/00
(52) U.S. Cl. ............... 369/13.1; 369/13.42; 369/275.2; 369/288
(58) Field of Search .................... 369/13.07, 13.1, 369/13.49, 13.43, 13.48, 13.44, 13.35, 13.38, 13.41, 13.42, 13.45, 13.46, 275.2, 288

(56) References Cited

U.S. PATENT DOCUMENTS 5,463,578 A * 10/1995 Gambino et al. ........... 365/122
5,583,727 A * 12/1996 Parkin ........................ 360/324
5,666,346 A * 9/1997 Nishimura ................ 369/275.2
5,986,978 A * 11/1999 Rottmayer et al. ....... 369/13.17
6,345,016 B1 * 2/2002 Shiratori ................... 369/13.54

* cited by examiner

Primary Examiner—Ali Neyzari
(74) Attorney, Agent, or Firm—Thomas R. Berthold

(57) ABSTRACT

A magnetic recording medium for thermally-assisted recording is a bilayer of a high-coercivity, high-anisotropy ferromagnetic material like FePt and a switching material like FeRh or Fe(RhM) (where M is Ir, Pt, Ru, Re or Os) that exhibits a switch from antiferromagnetic to ferromagnetic at a transition temperature less than the Curie temperature of the high-coercivity material. The high-coercivity recording layer and the switching layer are exchange coupled ferromagnetically when the switching layer is in its ferromagnetic state. To write data the bilayer medium is heated above the transition temperature of the switching layer. When the switching layer becomes ferromagnetic, the total magnetization of the bilayer is increased, and consequently the switching field required to reverse a magnetized bit is decreased without lowering the anisotropy of the recording layer. The magnetic bit pattern is recorded in both the recording layer and the switching layer. When the media is cooled to below the transition temperature of the switching layer, the switching layer becomes antiferromagnetic and the bit pattern remains in the high-anisotropy recording layer.

4 Claims, 4 Drawing Sheets

METHOD FOR THERMALLY-ASSISTED RECORDING ON A MAGNETIC RECORDING DISK

RELATED APPLICATION

This application is a continuation of application Ser. No. 10/015,513 filed Dec. 11, 2001, now abandoned.

TECHNICAL FIELD

This invention relates to thermally-assisted magnetic recording (TAMR) disk drives, in which data is written while the magnetic recording layer is at an elevated temperature, and more particularly to a TAMR disk that has a ferromagnetic recording layer exchange-coupled to an antiferromagnetic-to-ferromagnetic switching layer.

BACKGROUND OF THE INVENTION

Magnetic recording disk drives use a thin film inductive write head supported on the end of a rotary actuator arm to record data in the recording layer of a rotating disk. The write head is patterned on the trailing surface of a head carrier, such as a slider with an air-bearing surface (ABS) to allow the slider to ride on a thin film of air above the surface of the rotating disk. The write head is an inductive head with a thin film electrical coil located between the poles of a magnetic yoke. When write current is applied to the coil, the pole tips provide a localized magnetic field across a gap that magnetizes regions of the recording layer on the disk so that the magnetic moments of the magnetized regions are oriented into one of two distinct directions. The transitions between the magnetized regions represent the two magnetic states or binary data bits. The magnetic moments of the magnetized regions are oriented in the plane of the recording layer in longitudinal or horizontal recording, and perpendicular to the plane in perpendicular or vertical recording.

The magnetic material (or media) for the recording layer on the disk is chosen to have sufficient coercivity such that the magnetized data bits are written precisely and retain their magnetization state until written over by new data bits. The data bits are written in a sequence of magnetization states to store binary information in the drive and the recorded information is read back with a use of a read head that senses the stray magnetic fields generated from the recorded data bits. Magnetoresistive (MR) read heads include those based on anisotropic magnetoresistance (AMR), giant magnetoresistance (GMR) such as the spin-valve type of GMR head, and more recently magnetic tunneling, such as the magnetic tunnel junction (MTJ) head. Both the write and read heads are kept in close proximity to the disk surface by the slider's ABS, which is designed so that the slider "flies" over the disk surface as the disk rotates beneath the slider.

The areal data density (the number of bits that can be recorded on a unit surface area of the disk) is now approaching the point where magnetic grains that make up the data bits are so small that they can be demagnetized simply from thermal instability or agitation within the magnetized bit (the so-called "superparamagnetic" effect). To avoid thermal instabilities of the stored magnetization, a minimal stability ratio of stored magnetic energy per grain, $K_U V$, to thermal energy, $k_B T$, of $K_U V/k_B T >> 60$ will be required where $K_U$ and $V$ are the magneto-crystalline anisotropy and the magnetic switching volume, respectively, and $k_B$ and $T$ are the Boltzman constant and absolute temperature, respectively. Because a small number of grains of magnetic material per bit are required to prevent unacceptable media noise, the switching volume $V$ will have to decrease, and accordingly $K_U$ will have to increase. However, increasing $K_U$ also increases the switching field, $H_0$, which is proportional to the ratio $K_U/M_S$, where $M_S$ is the saturation magnetization (the magnetic moment per unit volume). (The switching field $H_0$ is the field required to reverse the magnetization direction, which for most magnetic materials is very close to but slightly greater than the coercivity or coercive field $H_C$ of the material.) Obviously, $H_0$ cannot exceed the write field capability of the recording head, which currently is limited to about 9 kOe for longitudinal recording, and perhaps 15 kOe for perpendicular recording.

Since it is known that the coercivity of the magnetic material of the recording layer is temperature dependent, one proposed solution to the thermal stability problem is thermally-assisted magnetic recording (TAMR), wherein the magnetic material is heated locally to near or above its Curie temperature during writing to lower the coercivity enough for writing to occur, but high enough for thermal stability of the recorded bits at the ambient temperature of the disk drive (i.e., the normal operating or "room" temperature). Several approaches for heating the media in TAMR have been proposed, including use of a laser beam or ultraviolet lamp to do the localized heating, as described in "Data Recording at Ultra High Density", *IBM Technical Disclosure Bulletin*, Vol. 39, No. 7, July 1996, p. 237; "Thermally-Assisted Magnetic Recording", *IBM Technical Disclosure Bulletin*, Vol. 40, No. 10, October 1997, p. 65; and IBM's U.S. Pat. No. 5,583,727. A read/write head for use in a TAMR system is described in U.S. Pat. No. 5,986,978, wherein a special optical channel is fabricated adjacent to the pole or within the gap of a write head for directing laser light or heat down the channel. IBM's pending application Ser. No. 09/608,848 filed Jun. 29, 2000 describes a TAMR disk drive wherein the thin film inductive write head includes an electrically resistive heater located in the write gap between the pole tips of the write head for locally heating the magnetic recording layer.

Generally, $K_U$ and $M_S$ of a magnetic material decrease with temperature according to $K_U(T) \sim M_S(T)^n$ (e.g., n=3 for cubic materials), such that $H_0 = \alpha K_U/M_S$ also decreases steadily with increasing temperature, where $\alpha \approx 1$ for isotropic media and $\alpha \approx 2$ for highly oriented media. Therefore by heating the media during the write process and letting it cool to room temperature, the write field constraint of the head can be circumvented while at the same time retaining the long time thermal stability of the stored magnetizations representing the recorded data bits. However, for materials with a very high magneto-crystalline anisotropy this requires writing at close to the Curie temperature of the media. In IBM's pending application Ser. No. 09/874,100 filed Jun. 4, 2001, a technique is described that uses a bilayer of two ferromagnetic materials. The first ferromagnetic layer is formed of a high-coercivity (or magnetically "hard") material that has a room temperature coercivity too high for writing with a conventional write head and a low Curie temperature. The second ferromagnetic layer directly above or below the first layer is formed of a low-coercivity (or magnetically "soft") material with a coercivity suitable for writing with a conventional write head and a high Curie temperature. During writing the bilayer is heated to a temperature of about or slightly above the Curie temperature of the first layer, thereby reducing or eliminating the coercivity of the first layer. The bit pattern is then recorded in the second layer. The two layers then cool, and as the first layer cools to below its Curie temperature, it becomes ferromagnetic again and the bit pattern is "copied" from the second layer into the first layer by magnetic exchange interaction. Upon further cooling the anisotropy of the first layer returns to its original high value, thus providing the desired long-term stability of the recorded data bits.

A practical implementation of this type of TAMR disk uses a layer of low coercivity material suitable for writing with a conventional write head and with a high Curie temperature $T_{CL}$ (e. g., a granular CoPtCrB alloy), and a layer of high coercivity material incapable of being written to by a conventional write head and with a low Curie temperature $T_{CH}$ (e. g., chemically-ordered high anisotropy FePt).

The switching field $H_0$ of such a bilayer material is best approximated by $$H_0 = \alpha \cdot \frac{K_H t_H + K_L t_L}{M_H t_H + M_L t_L}$$

where $K_H$ and $K_L$ are the anisotropy constants of the high and low coercivity layers, respectively, $M_H$ and $M_L$ are the saturation magnetization values of the high and low coercivity layers, respectively, and $t_H$ and $t_L$ are the thicknesses of the high and low coercivity layers, respectively. Writing is then achieved by heating the bilayer to a minimum write temperature $TW \cong T_{CH} \cong 600$ K, whereby $K_H$ is significantly reduced such that $H_0$ of the bilayer is below the available write field of the head. Due to the steep temperature dependence of $K_H$ at or near $T_{CH}$ and a distribution of $T_{CH}$ given by the grain size distribution in the high-coercivity layer, it will be desirable to write data at $TW > T_{CH}$, which will undesirably expose adjacent data tracks to thermal decay of the stored information. According to the formula given above, at room temperature the switching field $H_0$ of the bilayer, although higher than the switching field of the low-coercivity layer, $H_{0L} = \alpha K_L/M_L$, will always be lower than the switching field of the high-coercivity layer, $H_{0H} = \alpha K_H/M_H$. This will effectively reduce the potential gain in areal density provided by the high anisotropy material.

IBM's U.S. Pat. No. 5,463,578 describes a magneto-optic (MO) recording medium that uses an antiferromagnetic-to-ferromagnetic switching material, such as FeRh, between a high-coercivity bias layer with a very high Curie temperature and the perpendicularly magnetized MO recording layer. The MO layer must be formed of a material with a Curie temperature less than the transition temperature $T_{AF}$ of the switching material ($T_{AF}$ is the temperature at which the material switches from its antiferromagnetic state at room temperature to its ferromagnetic state). To record the MO layer in one magnetization direction, the medium is heated to a temperature above both the Curie temperature of the MO layer and $T_{AF}$, which renders the switching material ferromagnetic and allows the bias layer to couple its field through the switching material to the MO layer. To record the MO layer in the opposite magnetization direction, the medium is heated to a temperature above the Curie temperature of the MO layer but below $T_{AF}$ so that the switching material remains antiferromagnetic and prevents the bias layer from affecting the magnetization direction of the MO layer. U.S. Pat. No. 5,666,346 describes a MO medium that functions similar to the MO medium of the '578 patent in that it uses an antiferromagnetic-to-ferromagnetic switching layer to merely mediate coupling between the MO layer and a bias layer. U.S. Pat. No. 5,663,935 describes a MO recording medium that also uses an antiferromagnetic-to-ferromagnetic switching layer beneath the MO layer, but takes advantage of the property that the switching material has a transition temperature hysteresis, meaning that $T_{AF}$ is slightly greater than the temperature $T_{FA}$ at which the material switches from ferromagnetic back to antiferromagnetic. The Curie temperature of the MO layer in the '935 patent is required to be between $T_{FA}$ and $T_{AF}$.

For TAMR it is desirable to take full advantage of the room-temperature high anisotropy of a high-coercivity recording material like FePt, but still allow writing to the material at an elevated temperature well below its Curie temperature $T_C$. In addition, this recording material must have sufficient magnetic moment at room temperature to allow reading of the recorded data by a conventional MR read head.

SUMMARY OF THE INVENTION

The invention is a TAMR disk that uses a bilayer medium of a high-coercivity high-anisotropy ferromagnetic material like FePt and a switching material like FeRh or Fe(RhM) (where M is Ir, Pt, Ru, Re or Os) that exhibits a switch from antiferromagnetic to ferromagnetic at a transition temperature less than the Curie temperature of the high-coercivity material. The high-coercivity recording layer and the switching layer are exchange coupled ferromagnetically when the switching layer is in its ferromagnetic state. To write data the bilayer medium is heated above the transition temperature of the switching layer. When the switching layer becomes ferromagnetic, the total magnetization of the bilayer is increased, and consequently the switching field required to reverse a magnetized bit is decreased without lowering the anisotropy of the recording layer. The magnetic bit pattern is recorded in both the recording layer and the switching layer. When the media is cooled to below the transition temperature of the switching layer, the switching layer becomes antiferromagnetic and the bit pattern remains in the high-anisotropy recording layer.

For a fuller understanding of the nature and advantages of the present invention, reference should be made to the following detailed description taken together with the accompanying figures.

DETAILED DESCRIPTION OF THE INVENTION

Figure 1:
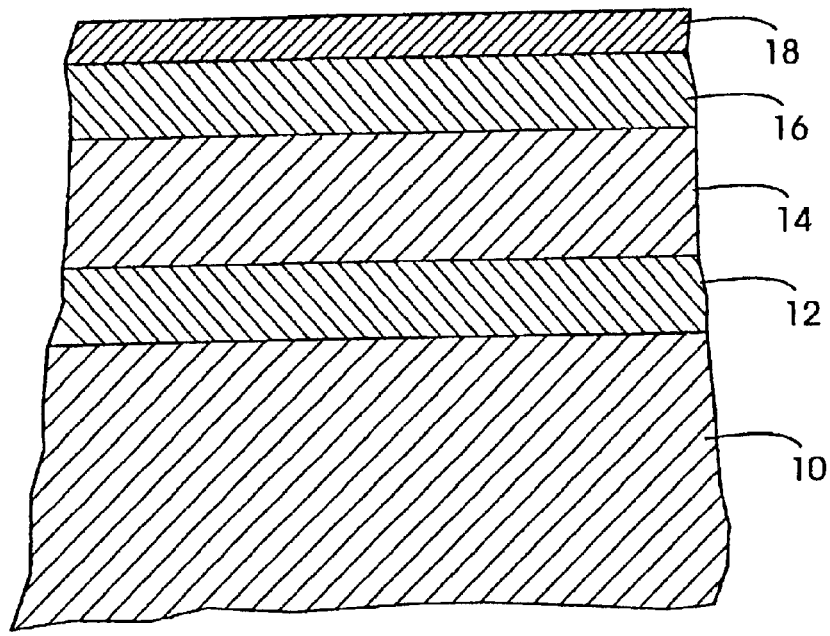
FIG. 1 is a sectional view of a TAMR disk of the present invention illustrating the switching layer and recording layer.

FIG. 1 shows a sectional view of the TAMR disk of the present invention. The disk comprises a substrate 10, an optional seed layer or underlayer 12, a FeRh antiferromagnetic-to-ferromagnetic switching layer 14, a high anisotropy ferromagnetic recording or storage layer 16 on the switching layer 14, and a protective overcoat 18. The recording layer 16 is shown on top of the switching layer 14, but these two layers can be reversed. The optional seed layer 12 is used to enhance the growth of the layer immediately above it.

The disk substrate 10 is typically glass, but may be any conventional disk substrate material. The overcoat 18 is typically diamond-like amorphous carbon or nitrogenated carbon, but may be any conventional disk overcoat. All of the layers 12, 14, 16 and 18 are deposited on the substrate 10 by conventional thin film deposition techniques, such as RF or DC magnetron sputtering, ion beam deposition, or molecular beam epitaxy.

The switching layer 14 is formed of an alloy of FeRh or Fe(RhM) that has the property that it transitions from antiferromagnetic to ferromagnetic as the temperature is increased to a transition temperature $T_{AF}$. FeRh or Fe(RhM) alloys with this property are substantially in the body-centered-cubic (bcc) phase and are substantially chemically-ordered. Thus the switching layer 14 is preferably formed of $Fe_x(Rh_{100-y}M_y)_{100-x}$, ($0 \leq y \leq 15$), where the value of x is selected so that the Fe(RhM) (or FeRh if y=0) alloy is substantially in the bcc phase. In the chemically-ordered bcc structure Fe atoms occupy the cube corners and Rh atoms the cube centers. For Fe-rich alloys certain of the Rh atoms are substituted with Fe atoms, and for Rh-rich alloys certain of the Fe atoms are substituted with Rh atoms in the cubic structure. According to the phase diagram $Fe_xRh_{100-x}$ alloys exhibit a single bcc phase for $48.5 \leq x \leq 55$, and a two-phase mixture of bcc and face-centered-cubic (fcc) for $33 \leq x \leq 48.5$. Thus for the present invention it is believed that the FeRh or Fe(RhM) alloy will have a sufficient amount of bcc-phase material to exhibit the required antiferromagnetic-to-ferromagnetic transition if x is approximately in the range of $40 \leq x \leq 55$. The FeRh or Fe(RhM) alloy becomes substantially chemically-ordered by deposition at an elevated temperature or by post-deposition annealing.

Figure 2:
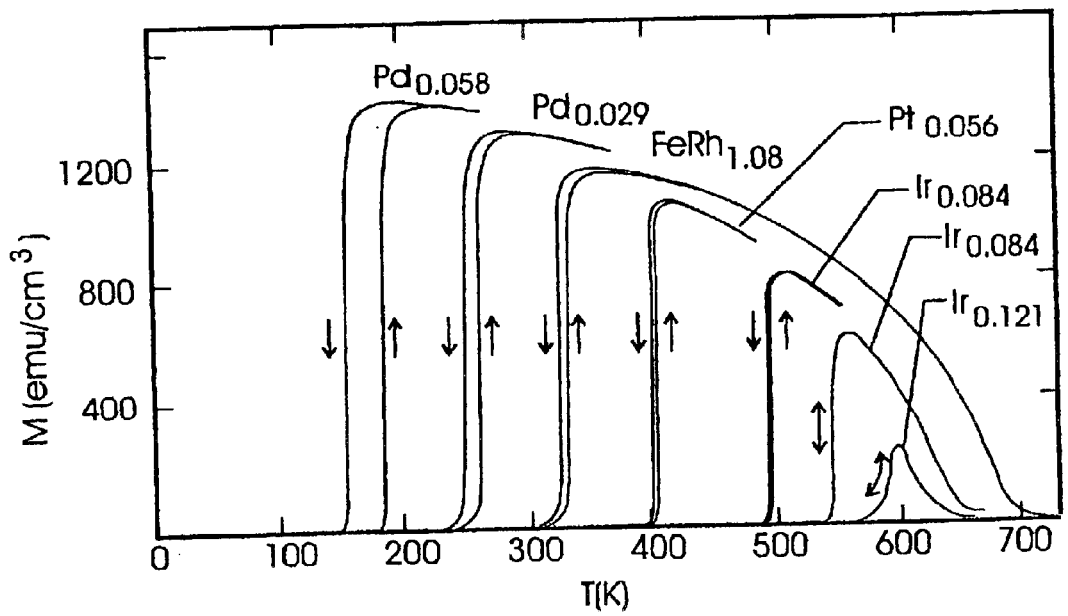
FIG. 2 is a graph of transition temperature $T_{AF}$ as a function of Ir, Pt and Pd content for a $Fe(Rh_{1-x}M_x)_{1.08}$ antiferromagnetic-to-ferromagnetic switching material.

The transition temperature $T_{AF}$ of the FeRh alloy can be increased to match the recording system requirements by substituting a fraction of the Rh atoms with the third element M. The element M is selected from the group consisting of Ir, Pt, Ru, Re and Os. FIG. 2 (reproduced from FIG. 1(a) in J. S. Kouvel, *J. Appl. Phys.* 37, 1257 (1966)) shows the magnetization vs. temperature curves (and thus the transition temperature $T_{AF}$) for bulk $Fe(Rh_{1-x}M_x)_{1.08}$ single crystal samples, where M=Pt, Ir or Pd. As shown by the figure, Pt and Ir increase $T_{AF}$, with Ir having a significantly greater influence than Pt, while Pd decreases $T_{AF}$.

The ferromagnetic recording or storage layer 16 is a high anisotropy material with a room-temperature coercivity so high that it is incapable of being written to by a conventional write head, and may be either perpendicular or horizontal type recording material. The material of recording layer 16 has a Curie temperature $T_{CH}$ greater than and preferably well above $T_{AF}$.

One type of material for recording layer 16 is chemically-ordered FePt or CoPt with its c-axis substantially out-of-plane for perpendicular recording or substantially in-plane for horizontal recording. Chemically-ordered alloys of FePt and CoPt, in their bulk form, are known as tetragonal $L1_0$-ordered phase materials (also called CuAu(I) materials). They are known for their high magneto-crystalline anisotropy and magnetic moment, properties that are desirable for high-density magnetic recording materials. These chemically-ordered films can be made by several known processes. Films having the $L1_0$ phase of FePt with the c-axis oriented out-of-plane or perpendicular to the substrate, and thus suitable for perpendicular magnetic recording media, have been grown onto a hot substrate by molecular beam epitaxy and by sputter deposition. They can also be formed by alternating the deposition of films of Fe and Pt, followed by annealing, the latter approach being described in U.S. Pat. No. 5,363,794. Chemically-ordered alloys of FePt and CoPt have also been proposed for horizontal magnetic recording media. For example, equi-atomic FePt or CoPt can be sputter deposited as a continuous film and then subjected to a relatively high-temperature post-deposition annealing to achieve the chemical ordering. This approach results in the c-axis being oriented substantially in the plane of the film, so that the films are suitable for horizontal magnetic recording, as described by Coffey et al., "High Anisotropy $L1_0$ Thin Films for Longitudinal Recording", *IEEE Transactions on Magnetics*, Vol. 31, No. 6, November 1995, pp. 2737–2739. In IBM's U.S. Pat. No. 6,086,974, a continuous granular film with grains of a chemically-ordered FePt or CoPt alloy in the tetragonal $L1_0$ structure and with the c-axis in the plane for horizontal magnetic recording, is produced by sputtering without annealing. Other high anisotropy materials suitable for the recording layer 16 include pseudo-binary alloys based on the FePt and CoPt $L1_0$ phase, i.e., FePt—X and CoPt—X, where the element X may be Ni, Au, Cu, Pd or Ag, as well as granular composite materials such as FePt—C, FePt—ZrO, FePt—MgO, FePt—$B_2O_3$ and other similar composites. While these materials in general have similarly high anisotropy as the binary alloy FePt and CoPt, they allow additional control over the magnetic and structural properties of the media. Other materials with perpendicular magnetic anisotropy include Co—Pt, Co—Pd, Fe—Pt and Fe—Pd multilayers. These multilayers provide the advantage that they can be processed at lower temperatures than the $L1_0$ phase materials, while offering relatively high magneto-crystalline anisotropy. Current horizontal magnetic recording disks use a recording layer of a granular CoPtCr alloy, such as CoPtCrB or CoPtCrTa. The anisotropy of this horizontal magnetic recording media can be raised to a level suitable for a high $K_U$ layer in TAMR by increasing the Pt content and decreasing the Cr content.

Figure 3:
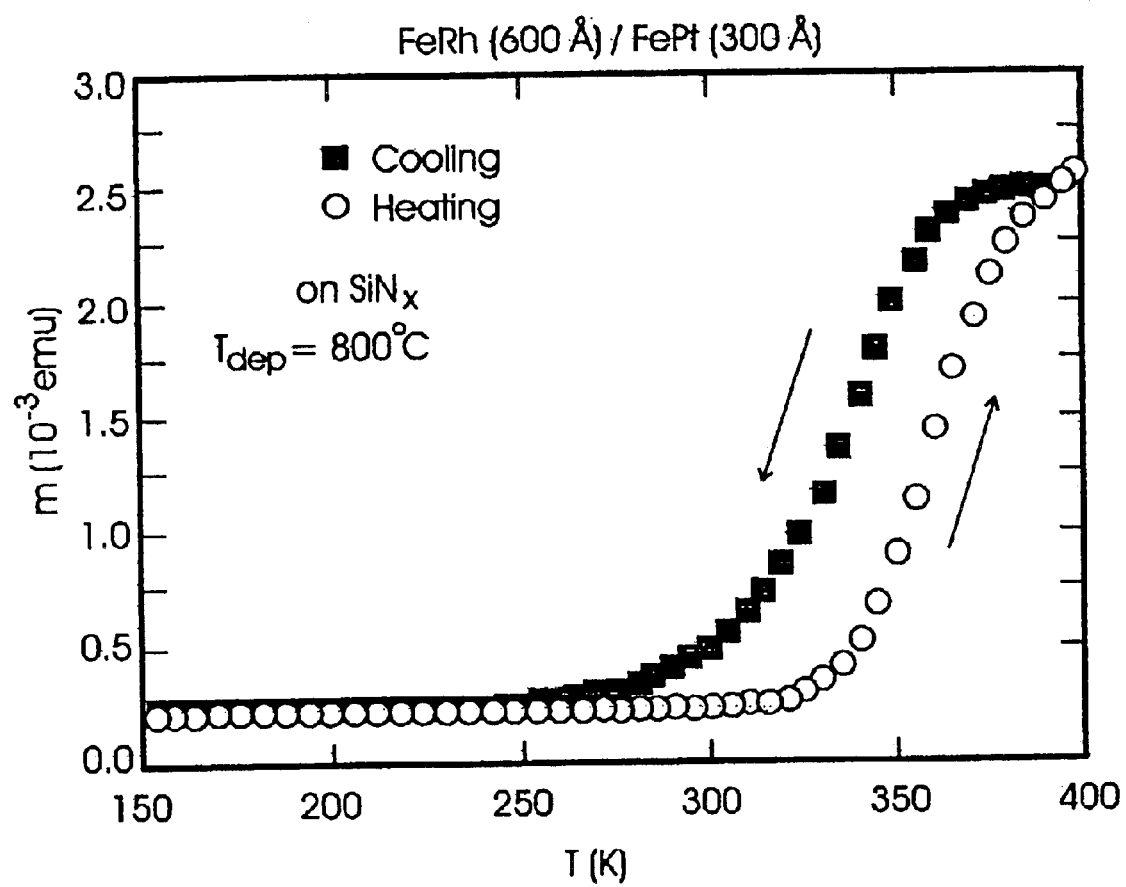
FIG. 3 illustrates the cycle of magnetic moment with temperature for a FeRh/FePt bilayer.

FIG. 3 shows the moment temperature hysteresis of a FeRh (600 Å)/FePt (300 Å) bilayer deposited at 800° C. onto Si. At 250 K the FePt is ferromagnetic and the FeRh is antiferromagnetic. At 400 K both the FePt and the FeRh are ferromagnetic.

Figure 4A:
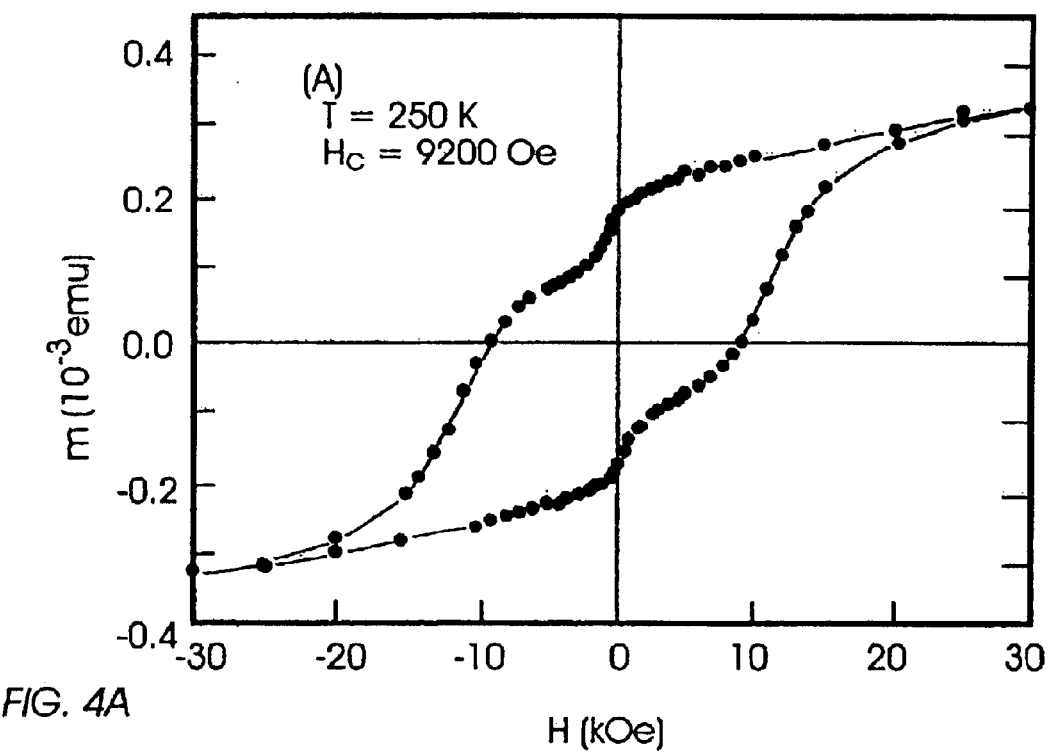
FIGS. 4A-4B are magnetic hysteresis loops for FeRh/FePt bilayers at 250 K and 390 K, respectively.
Figure 4B:
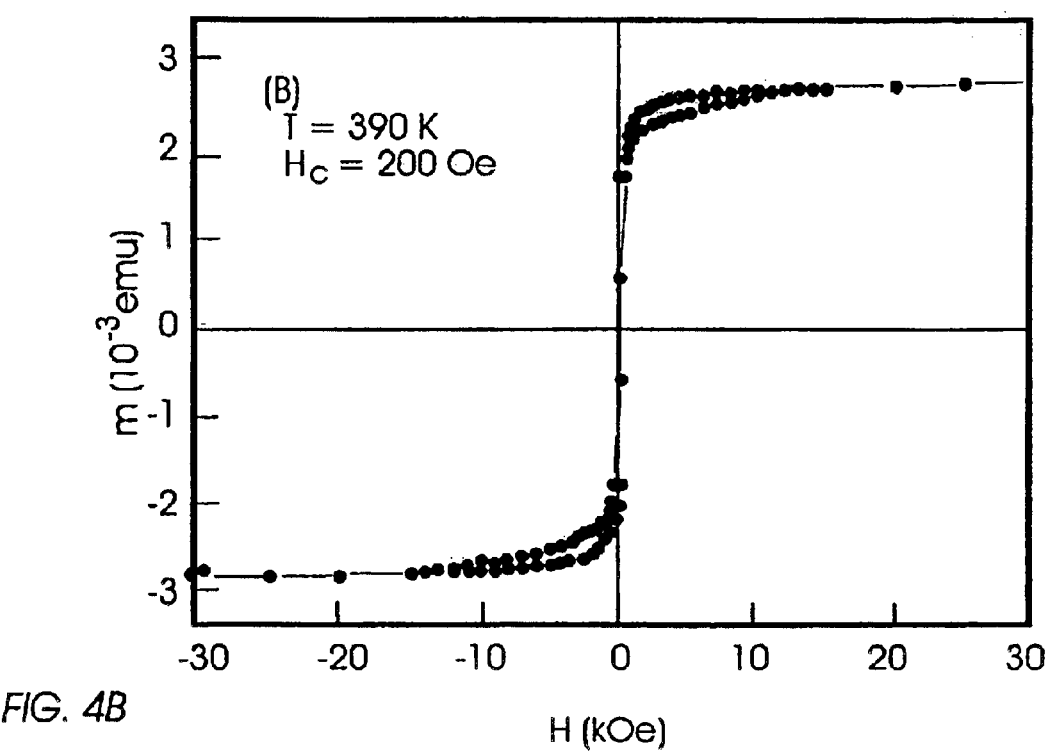

FIGS. 4A and 4B show the hysteresis loops of this FeRh/FePt bilayer below and above the FeRh transition temperature $T_{AF}$, respectively. Below $T_{AF}$, at 250 K the coercivity is 9200 Oe, and above $T_{AF}$, at 390 K the coercivity is decreased to 200 Oe. Thus the switching field $H_0$ to write at 390 K is considerably lowered, since the total moment of the bilayer jumps about one order of magnitude due to the FeRh being ferromagnetic. Thus this medium can be written at 390 K and will be stable at 250 K. For TAMR applications Pt or Ir can be added to the FeRh to increase the transition temperature. The reason it may be desirable to raise $T_{AF}$ above 400 K is to assure that FeRh is in the antiferromagnetic state at room temperature to maintain a stable magnetization in the high coercivity FePt layer at room temperature.

Figure 5:
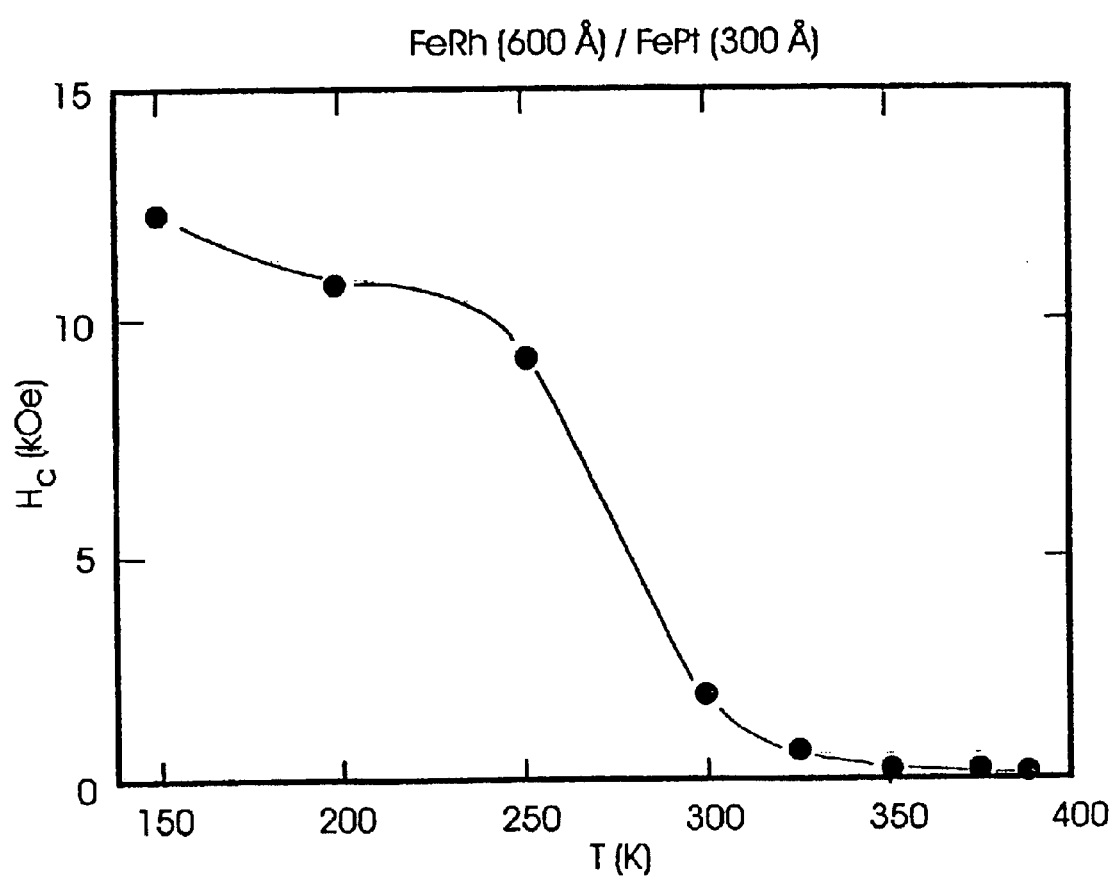
FIG. 5 is a graph of coercivity versus temperature for a FeRh/FePt bilayer.

FIG. 5 shows the temperature dependence of the coercivity for the same FeRh/FePt bilayer. Generally $H_C$ of the bilayer decreases with increasing temperature, but around 200 K it starts to decrease at an accelerated rate due to the FeRh becoming ferromagnetic at 350 K.

The invention will now be explained using a specific example. The media structure comprises a glass substrate, a 50 Å thick MgO seed layer to define grain size and provide crystallographic orientation to the subsequent metal layers, a 120 Å thick switching layer of $Fe_{48}(Rh_{94}Pt_6)_{52}$, and a 40

Å thick storage layer of $Fe_{45}Ni_{10}Pt_{45}$ doped with a nonmagnetic material such as alumina, zirconia or a similar material to provide exchange decoupling of the magnetic grains. Preferably this layer will be grown to have perpendicular magnetic orientation. The switching layer has a transition temperature $T_{AF}$ of about 400 K. The magnetic storage layer has room temperature magnetization MH=1000 emu/cm³ and anisotropy KH=2.5×10⁷ erg/cm³. Magnetization of the switching layer is ML=800 emu/cm³ at the chosen write temperature $T_W$=500 K. At the compositions given above the transition temperature $T_{AF}$ is well below the Curie temperatures of both the Fe(RhPt) ($T_{CL}$=650 K) and the FeNiPt ($T_{CH}$=750 K).

To write data, the media is heated to about 500 K, where $K_H$=1.25×10⁷ erg/cm³, $M_H$=800 emu/cm³, and $M_L$=800 emu/cm³, resulting in a switching field:

$$H_0 = 2 \cdot \frac{K_H t_H}{M_H t_H + M_L t_L} \approx 9 \text{ kOe}$$

At this elevated temperature the switching layer and the storage layer are strongly exchange-coupled ferromagnetically, and the media is writeable by a conventional write head so that the magnetic bit pattern is recorded in both the storage layer and the switching layer. Subsequently, the media is cooled down to below the transition temperature $T_{AF}$ of the Fe(RhPt) switching layer. Consequently the Fe(RhPt) layer becomes antiferromagnetic and the bit pattern remains in the FeNiPt storage layer. At room temperature or at the maximum storage temperature (approximately 340 K) the switching field of the media is then given by the switching field of just the high anisotropy FeNiPt storage layer:

$$H_0 = 2 \cdot \frac{K_H}{M_H} \approx 50 \text{ kOe}$$

Thus the thermal stability at room temperature is greatly enhanced over purely ferromagnetic media with a switching field of 9 kOe. The two layers need to be strongly ferromagnetically coupled, which is achieved by growing them in direct contact with each other. The FePt-based storage layer is preferably grown on top of the Fe(RhM) switching layer to minimize the magnetic spacing between the ferromagnetic storage layer and the read sensor for reading back the recorded data.

Variations of this specific example may include a textured FePt layer for horizontal recording as described in the previously cited '974 patent, a laminated structure of successive FePt and Fe(RhM) layers, a Fe(RhM) layer combined with a CoPt multilayer for perpendicular recording, and a Fe(RhM) layer combined with a conventional granular CoPtCrB layer for horizontal recording. In each of these structures the Fe(RhM) layer will be ferromagnetically coupled to the magnetic storage layer.

The present invention has the advantage of reducing the switching field $H_0$ for magnetization reversal without reducing the anisotropy of the FePt-based storage layer due to the additional magnetization provided by the FeRh layer when it is above its transition temperature $T_{AF}$. For example, if an FeRh/FePt grain has a $K_u V/k_B T$ value of 80 at the maximum storage temperature (approximately 340 K), then when the temperature is raised to 400 K to transform the FeRh to its ferromagnetic state, the $K_u V/k_B T$ of the composite grain will not be reduced more than that of a FePt-based grain, but there will be a significant improvement in the ability to write data. This will help to reduce thermal activation of the composite grain as it cools back to room temperature. As discussed above, this has a considerable advantage in terms of both writeability and stability over TAMR schemes using media having one or more layers, each of which is ferromagnetic over the entire temperature range between the storage temperature (room temperature) and the write temperature.

Thus the Fe(RhM) switching material, in combination with a high anisotropy recording material, has significant benefits for TAMR media, including (a) high anisotropy (and thus high thermal high stability) combined with low magnetization (and thus low demagnetization field) at room temperature, (b) increased moment at writing temperature, and (c) rapid fixing of the magnetization pattern due to the relatively small temperature range between the antiferromagnetic and ferromagnetic state of the Fe(RhM).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for thermally-assisted recording on a magnetic recording disk by applying a magnetic write field to a region of the disk while said region is at a temperature above the storage temperature, the method comprising:
   providing a magnetic recording disk, the disk comprising
      a substrate;
      a layer of antiferromagnetic-to-ferromagnetic switching material on the substrate, the switching material being antiferromagnetic at a storage temperature below 340 K and having an antiferromagnetic-to-ferromagnetic transition temperature $T_{AF}$ greater than 340 K and a Curie temperature $T_{CL}$ greater than $T_{AF}$, the switching material comprising $Fe_x(Rh_{100-y}M_y)_{100-x}$, where ($0 \leq y \leq 15$) and ($40 \leq x \leq 55$), and M is an element selected from the group consisting of Ir, Pt, Ru, Re and Os; and
      a layer of ferromagnetic recording material in contact with the switching layer and being magnetized in said region and having a Curie temperature $T_{CH}$ greater than $T_{AF}$ and a storage temperature coercivity too high to permit switching of its magnetization by the applied write field at the storage temperature, the switching layer and recording layer being-coupled ferromagnetically at a temperature greater than $T_{AF}$ and less than both $T_{CL}$ and $T_{CH}$;
   heating the recording layer and the switching layer in said region to a temperature greater than $T_{AF}$ and less than both $T_{CL}$ and $T_{CH}$; whereby the switching layer becomes ferromagnetic and ferromagnetically coupled with the recording layer, and the ferromagnetically coupled switching layer and recording layer achieve a coercivity substantially less than the storage temperature coercivity of the recording layer; and
   applying the write field to the heated region of the ferromagnetically coupled switching layer and recording layer to switch the magnetization of the recording layer in said region; whereby after the temperature in said region returns to the storage temperature the switching layer is antiferromagnetic and the recording layer in said region retains its switched magnetization.

2. The method of claim 1 wherein providing the disk comprises providing a disk having the recording layer on top of the switching layer with the switching layer located between the substrate and the recording layer.

3. The method of claim 1 wherein providing the disk comprises providing a disk having a recording layer with substantially perpendicular magnetic anisotropy.

4. The method of claim 1 wherein providing the disk comprises providing a disk having a recording layer with substantially horizontal magnetic anisotropy.

* * * * *